US010026192B2

(12) United States Patent
Nichols et al.

(10) Patent No.: US 10,026,192 B2
(45) Date of Patent: Jul. 17, 2018

(54) COLOR HARMONY VERIFICATION SYSTEM

(71) Applicant: Ford Global Technologies, LLC, Dearborn, MI (US)

(72) Inventors: Mark Edward Nichols, Saline, MI (US); Kevin Richard John Ellwood, Ann Arbor, MI (US); Christopher Michael Seubert, New Hudson, MI (US); Tony Misovski, Oxford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 14/057,527

(22) Filed: Oct. 18, 2013

(65) Prior Publication Data

US 2015/0109443 A1 Apr. 23, 2015

(51) Int. Cl.
*H04N 7/18* (2006.01)
*G06T 7/40* (2017.01)
*G06T 7/00* (2017.01)
*G06T 7/90* (2017.01)

(52) U.S. Cl.
CPC ............ *G06T 7/408* (2013.01); *G06T 7/001* (2013.01); *G06T 7/90* (2017.01); *G06T 2207/30156* (2013.01)

(58) Field of Classification Search
None
See application file for complete search history.

(56) References Cited

U.S. PATENT DOCUMENTS

| 5,864,114 | A | * | 1/1999 | Fukuda | B08B 7/0042 219/121.69 |
| 6,157,454 | A | * | 12/2000 | Wagner | A61B 5/0088 356/407 |
| 6,804,390 | B2 | * | 10/2004 | McClanahan | G01J 3/46 382/156 |
| 7,844,109 | B2 | * | 11/2010 | Matsuura | H04N 1/6033 348/187 |
| 8,326,017 | B2 | | 12/2012 | Seubert et al. | |

(Continued)

FOREIGN PATENT DOCUMENTS

CN 102055988 A 5/2011
CN 103024354 A 4/2013

OTHER PUBLICATIONS

X-Rite, "CarFlash System—Non-Contact Multi-Angle Spectrophotometer", Copyright 2007, X-Rite, Incorporated, Grand Rapids, Michigan, USA, 2 pages.

(Continued)

*Primary Examiner* — Heather Jones
(74) *Attorney, Agent, or Firm* — Brooks Kushman P.C.

(57) ABSTRACT

A system for non-contact color harmony analysis is provided. The system may include an image acquisition system and an image analysis system. One or more cameras may take images of two regions of an object (e.g., a vehicle). The images may be transferred to the image analysis system, which may compare color values from each region and determine a color value difference. The color value difference may be compared to a predetermined threshold value to identify a possible color mismatch. The system may be used to analyze color harmony of adjacent vehicle components, for example, a front fascia and a fender or a rear fascia and a quarter panel.

20 Claims, 3 Drawing Sheets

(56) References Cited

U.S. PATENT DOCUMENTS

| | | | | |
|---|---|---|---|---|
| 2001/0036309 | A1* | 11/2001 | Hirayama | G01J 3/46 382/167 |
| 2004/0078299 | A1* | 4/2004 | Down-Logan | G06Q 30/0601 705/26.1 |
| 2007/0250273 | A1* | 10/2007 | De Haas | G01J 3/46 702/22 |
| 2008/0040059 | A1* | 2/2008 | Ersue | G01B 11/30 702/82 |
| 2010/0027870 | A1* | 2/2010 | Rodrigues | G01N 21/25 382/141 |
| 2011/0103686 | A1 | 5/2011 | Kano | |
| 2011/0160892 | A1* | 6/2011 | Kettler | G01J 3/46 700/105 |

OTHER PUBLICATIONS

First Office Action for Chinese Application No. 201410553544.0, dated Apr. 2, 2018, 10 Pages.

\* cited by examiner

| | INGOT SILVER SERIES | | | | | | | | | | | | |
|---|---|---|---|---|---|---|---|---|---|---|---|---|---|
| | LEFT PANEL | | | RIGHT PANEL | | | DELTA (L-R) | | | PERCENT DIFFERENCE (1-PANEL X/PANEL 1) | | | MAX $\Delta E_{eff(\gamma)}$ | AVG $\Delta E_{eff(\gamma)}$ |
| L, R SAMPEL ID | R | G | B | R | G | B | R | G | B | R | G | B | | |
| 1,2 | 133.6 | 181.7 | 165.5 | 133.3 | 184.3 | 166.9 | 0.3 | -2.6 | -1.4 | 0% | -1% | -1% | 0.19 | 0.12 |
| 2,1 | 141.4 | 192.9 | 175.2 | 139.3 | 193.2 | 174.6 | 2.1 | -0.3 | 0.6 | -2% | 0% | 0% | | |
| 1,3 | 152.5 | 208.2 | 189.7 | 145.9 | 202.2 | 183.2 | 6.6 | 6 | 6.5 | 4% | 3% | 3% | 0.41 | 0.28 |
| 3,1 | 134.2 | 183 | 166.5 | 138.2 | 191.2 | 173.6 | -4 | -8.2 | -7.1 | 3% | 4% | 4% | | |
| 1,4 | 150 | 203.9 | 185.8 | 145.8 | 200.7 | 181.8 | 4.2 | 3.2 | 4 | -3% | -2% | -2% | 0.59 | 0.46 |
| 4,1 | 140.4 | 191.6 | 174 | 145.3 | 199.7 | 181.9 | -4.9 | -8.1 | -7.9 | 3% | 4% | 4% | | |
| 1,5 | 134 | 183 | 166.2 | 130.8 | 179.9 | 163.2 | 3.2 | 3.1 | 3 | -2% | -2% | -2% | 0.82 | 0.48 |
| 5,1 | 122 | 166.7 | 150.8 | 126.5 | 175 | 158.5 | -4.5 | -8.3 | -7.7 | 4% | 5% | 5% | | |
| 1,6 | 147.7 | 202.5 | 184.1 | 136.6 | 190.2 | 171.6 | 11.1 | 12.3 | 12.5 | -8% | -6% | -7% | 1.08 | 0.83 |
| 6,1 | 151.9 | 207.1 | 189 | 161.4 | 223.9 | 204 | -9.5 | -16.8 | -15 | 6% | 8% | 7% | | |

| | RED CANDY SERIES | | | | | | | | | | | | |
|---|---|---|---|---|---|---|---|---|---|---|---|---|---|
| | LEFT PANEL | | | RIGHT PANEL | | | DELTA (L-R) | | | PERCENT DIFFERENCE (1-L/R) | | | MAX $\Delta E_{eff(\gamma)}$ | AVG $\Delta E_{eff(\gamma)}$ |
| L, R SAMPEL ID | R | G | B | R | G | B | R | G | B | R | G | B | | |
| 1,2 | 115.9 | 35.8 | 38.1 | 105.2 | 29.2 | 31.4 | 10.7 | 6.6 | 6.7 | 9% | 18% | 18% | 0.76 | 0.63 |
| 2,1 | 119.2 | 36.2 | 38.7 | 116.8 | 34.4 | 36.7 | 2.4 | 1.8 | 2 | -2% | -5% | -5% | | |
| 1,3 | 109.8 | 32.7 | 34.8 | 98.3 | 27.8 | 29.2 | 11.5 | 4.9 | 5.6 | 10% | 15% | 16% | 0.95 | 0.84 |
| 3,1 | 102.9 | 29.8 | 31.5 | 105.1 | 29.1 | 31 | -2.2 | 0.7 | 0.5 | 2% | -2% | -2% | | |
| 1,4 | 104.3 | 31.3 | 33.3 | 96.4 | 25.4 | 27 | 8 | 5.9 | 6.3 | -8% | -23% | -23% | 1.60 | 0.86 |
| 4,1 | 126.6 | 34.8 | 37.5 | 120.5 | 33 | 35.5 | 6.1 | 1.8 | 2 | -5% | -5% | -6% | | |
| 1,5 | 124.5 | 37.2 | 39.7 | 111.9 | 31 | 33 | 12.6 | 6.2 | 6.7 | -11% | -20% | -20% | 1.27 | 0.73 |
| 5,1 | 100.6 | 28.2 | 30 | 100.8 | 28 | 29.9 | -0.2 | 0.2 | 0.1 | 0% | -1% | 0% | | |
| 1,6 | 113 | 34.4 | 36.7 | 96.5 | 28 | 29.3 | 16.5 | 6.4 | 7.4 | -17% | -23% | -25% | 1.11 | 1.00 |
| 6,1 | 91.7 | 27 | 28.4 | 93.9 | 26.4 | 28.1 | -2.2 | 0.6 | 0.3 | 2% | -2% | -1% | | |

| | STERLING GRAY SERIES | | | | | | | | | | | | |
|---|---|---|---|---|---|---|---|---|---|---|---|---|---|
| | LEFT PANEL | | | RIGHT PANEL | | | DELTA (L-R) | | | PERCENT DIFFERENCE (1-L/R) | | | MAX $\Delta E_{eff(\gamma)}$ | AVG $\Delta E_{eff(\gamma)}$ |
| L, R SAMPEL ID | R | G | B | R | G | B | R | G | B | R | G | B | | |
| 1,2 | 58.8 | 76.8 | 69.9 | 56.4 | 75.7 | 68.7 | 2.4 | 1.1 | 1.2 | 4% | 1% | 2% | 1.05 | 0.81 |
| 2,1 | 66.1 | 86.7 | 79.3 | 75.9 | 97 | 90.2 | -9.8 | -10.3 | -10.9 | 13% | 11% | 12% | | |
| 1,3 | 71.9 | 92.4 | 84.9 | 63.5 | 81.7 | 75.1 | 8.4 | 10.7 | 9.8 | 12% | 12% | 12% | 0.83 | 0.51 |
| 3,1 | 58.8 | 73.7 | 68.4 | 63.4 | 83 | 76 | -4.6 | -9.3 | -7.6 | 7% | 11% | 10% | | |
| 1,4 | 71.7 | 91.8 | 84.8 | 64.4 | 86 | 78.1 | 7.3 | 5.8 | 6.7 | -11% | -7% | -9% | 1.07 | 0.75 |
| 4,1 | 70.4 | 89.4 | 82.8 | 77.1 | 99.5 | 92.2 | -6.7 | -10.1 | -9.4 | 9% | 10% | 10% | | |
| 1,5 | 71.3 | 91.6 | 84.2 | 59.2 | 78.1 | 71.3 | 12.1 | 13.5 | 12.9 | -20% | -17% | -18% | 1.25 | 0.76 |
| 5,1 | 65.3 | 82.3 | 76.3 | 75.7 | 98 | 90.9 | -10.4 | -15.7 | -14.6 | 14% | 16% | 16% | | |
| 1,6 | 71.2 | 91.9 | 84.4 | 58 | 76.3 | 69.6 | 13.2 | 15.6 | 14.8 | -23% | -20% | -21% | 1.54 | 0.91 |
| 6,1 | 59 | 74.8 | 69.2 | 68.7 | 88.9 | 82.2 | -9.7 | -14.1 | -13 | 14% | 16% | 16% | | |

| | YELLOW BLAZE SERIES | | | | | | | | | | | | |
|---|---|---|---|---|---|---|---|---|---|---|---|---|---|
| | LEFT PANEL | | | RIGHT PANEL | | | DELTA (L-R) | | | PERCENT DIFFERENCE (1-L/R) | | | MAX $\Delta E_{eff(\gamma)}$ | AVG $\Delta E_{eff(\gamma)}$ |
| L, R SAMPEL ID | R | G | B | R | G | B | R | G | B | R | G | B | | |
| 1,2 | 164 | 160 | 79 | 158.9 | 157.3 | 75.8 | 5.1 | 2.7 | 3.2 | 3% | 2% | 4% | 0.40 | 0.26 |
| 2,1 | 146.3 | 140.6 | 70.2 | 141.6 | 138.4 | 67.5 | 4.7 | 2.2 | 2.7 | -3% | -2% | -4% | | |
| 1,3 | 177.6 | 173.2 | 86.3 | 167.4 | 164.7 | 80.4 | 10.2 | 8.5 | 5.9 | 6% | 5% | 7% | 1.28 | 0.58 |
| 3,1 | 147.9 | 141.6 | 70.9 | 147.3 | 143.7 | 70.5 | 0.6 | -2.1 | 0.4 | 0% | 1% | -1% | | |
| 1,4 | 175.6 | 171.4 | 85.6 | 165.2 | 162.1 | 78.2 | 10.4 | 9.3 | 7.4 | -6% | -6% | -9% | 0.68 | 0.49 |
| 4,1 | 147.9 | 141 | 70.1 | 148.2 | 145.1 | 71 | -0.3 | -4.1 | -0.9 | 0% | 3% | 1% | | |
| 1,5 | 146.2 | 141.9 | 71.3 | 132.4 | 129.2 | 61.8 | 13.8 | 12.7 | 9.5 | -10% | -10% | -15% | 1.40 | 1.16 |
| 5,1 | 132.6 | 126.2 | 61.4 | 139.3 | 137 | 67 | -6.7 | -10.8 | -5.6 | 5% | 8% | 8% | | |
| 1,6 | 146 | 142.2 | 71.4 | 129.4 | 124.2 | 58.3 | 16.6 | 18 | 13.1 | -13% | -14% | -22% | 3.24 | 2.18 |
| 6,1 | 140.7 | 133.8 | 65.2 | 142.4 | 139.9 | 69.2 | -1.7 | -6.1 | -4 | 1% | 4% | 6% | | |

FIG. 4

COLOR HARMONY VERIFICATION SYSTEM

TECHNICAL FIELD

This disclosure relates to a system and method for verifying color harmony between two surfaces.

BACKGROUND

Vehicle color harmony is sometimes considered a hallmark of the vehicle's quality and craftsmanship. Color harmony issues may arise from small mismatches between the colors of two adjacent surfaces on a vehicle's interior or exterior. The color mismatch may only be apparent under certain lighting conditions (metamerism) or may be observation angle dependent. The latter may be particularly true for exterior coated surfaces, which may display angular dependent color (e.g., the color depends upon the angle of illumination and observation due to the flake-shaped pigments in the coating). Color harmony issues may occur due to a color mismatch between adjacent vehicle surfaces.

SUMMARY

In at least one embodiment, a computer system is provided including a computer having memory storing instructions. When the instructions are executed by the computer, it carries out the following steps: receiving image data of a first and second region of an object; comparing a first color value from the first region and a second color value from the second region to obtain a color value difference; and determining if the color value difference exceeds a predetermined threshold to identify a color mismatch.

In one embodiment, the object may be a vehicle. The first region may be associated with a first vehicle component and the second region may be associated with a second, adjacent vehicle component. In one embodiment, the first vehicle component is a fender or a quarter panel and the second vehicle component is a front fascia or a rear fascia.

The first and second color values may each be selected from the group comprising red, green and blue (RGB) values. The first and second color values may each be an average color value of the first and second regions, respectively. In one embodiment, the image data of the first and second regions are included in a single image file. In another embodiment, the image data of the first and second regions are included in first and second image files, respectively. The predetermined threshold may be from 3 to 20%. The predetermined threshold may be determined based on the vehicle color. In one embodiment, the first and second regions are predetermined first and second regions selected from a larger image region.

In at least one embodiment, a color harmony analysis method is provided. The method may include imaging a first region and a second region of a moving vehicle; comparing a first color value from the first region and a second color value from the second region to obtain a color value difference; and determining if the color value difference exceeds a threshold value to identify a color mismatch.

The first region may be associated with a first vehicle component and the second region may be associated with a second, adjacent vehicle component. In one embodiment the comparing step includes comparing at least one of red, green, and blue (RGB) values from the first region and RGB values from the second region. The method may further include determining the threshold value based on a vehicle color or an image angle relative to the first and second regions.

The method may also include imaging at least two separate pairs of first regions and second regions; comparing a first color value from the first region and a second color value from the second region to obtain a color value difference in each pair; and determining if the color value difference in at least one pair exceeds a threshold value to identify a color mismatch.

In at least one embodiment, a system for non-contact color harmony analysis is provided. The system may include at least one camera configured to take an image of a first region and a second region of a vehicle; and a computer configured to receive the image and having memory storing instructions which, when executed by the computer, carries out the following steps: comparing a first color value from the first region and a second color value from the second region to obtain a color value difference; and determining if the color value difference exceeds a predetermined threshold to identify a color mismatch.

In one embodiment, the at least one camera is stationary. At least one light source may be included in the system, which may be configured to illuminate at least one of the first and second regions. The system may further include four cameras, each camera configured to take an image of a first region and an adjacent second region of the vehicle, the first and second regions being different for each image; wherein the computer is configured to receive the images and the memory storing instructions which, when executed by the computer, carries out the following steps: comparing a first color value from each first region and a second color value from each adjacent second region to obtain a color value difference for each first and second region; and determining if at least one of the color value differences exceeds a predetermined threshold.

BRIEF DESCRIPTION OF THE DRAWINGS

FIG. 4 is a table showing color data comparisons of six samples for four different colors.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It has been found that color mismatch may occur more often if two adjacent vehicle surfaces are painted at different locations or the surfaces are made of different materials. One example may be a color mismatch between the body and front or rear fascia, since the vehicle body may be painted in an assembly plant and the fascia may be painted at a location outside of the assembly plant (e.g., at a supplier facility). The body and fascia may be assembled together in a final assembly area of the plant, once the fascia is received from the outside location. While both the supplier and the assembly plant paint shop are supposed to apply the paint such that they are meeting an agreed upon "color master," there may be subtle drift between the color position of the body and the color position of the fascia.

For example, if a vehicle is supposed to be painted a certain shade of red, the assembly plant may drift slightly blue from the standard, while the fascia supplier may drift slightly yellow. Even though both have drifted a small absolute amount from the standard, the drift might be in opposite directions, such that the apparent color mismatch is quite high. While color data may be intermittently collected by both the fascia supplier and the assembly plant, generally not every vehicle is measured, since conducting human visual inspections of many or all vehicles assembled may be too costly or time consuming. Therefore, data comparisons are generally only done if a problem is observed.

Figure 1:
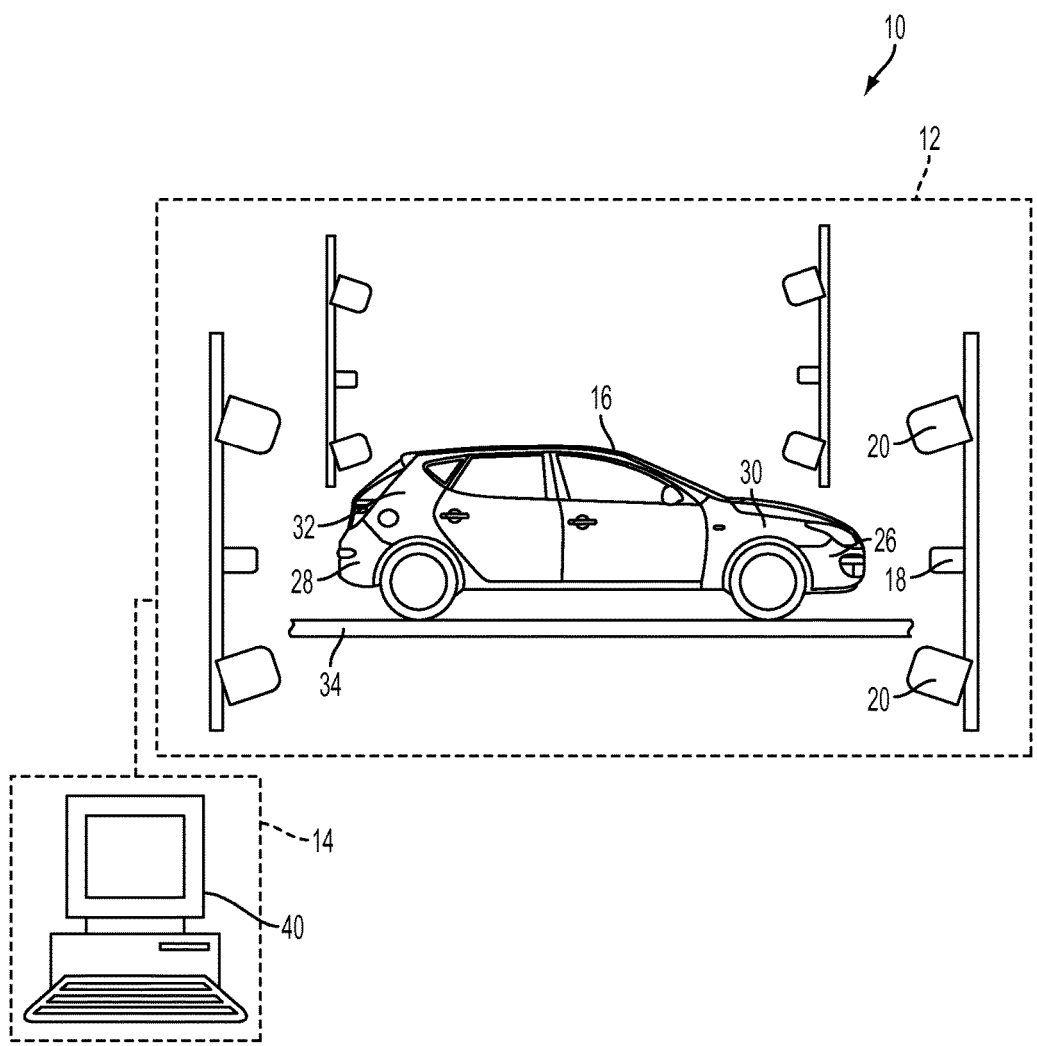
FIG. 1 is a schematic of a color harmony verification system.
Figure 2:
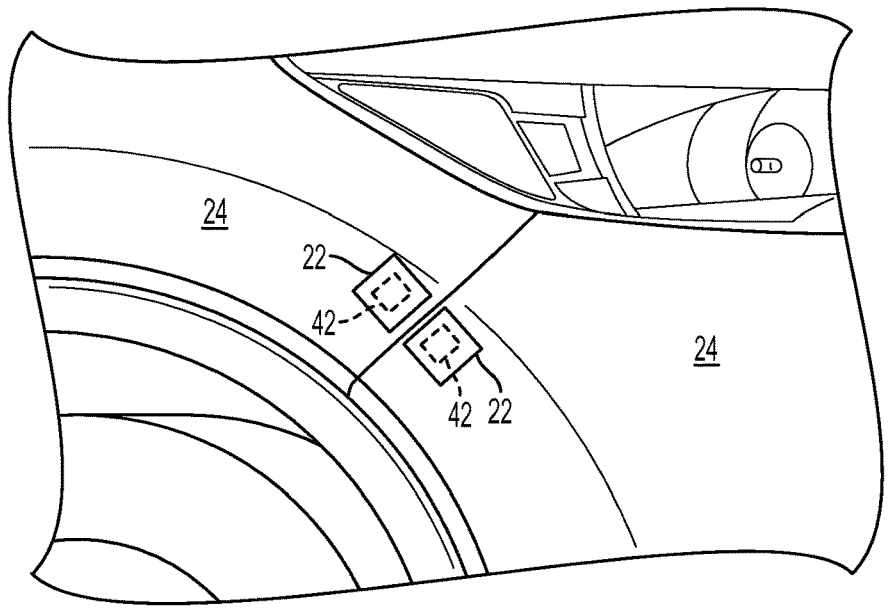
FIG. 2 is a close up view two adjacent vehicle components which may be analyzed using the system of FIG. 1.

With respect to FIGS. 1 and 2, a color harmony verification system 10 is provided in order analyze vehicle color mismatches before the vehicles leave the assembly plant. The system 10 may be fully automated and may be integrated into the assembly process with little or no added time and at low additional cost. The color harmony verification system 10 may include an image acquisition system 12 and an image analysis system 14 for determining color mismatch in a vehicle 16. While the system is illustrated and described with reference to a vehicle 16, the system 10 may be used to analyze any product in which color harmony between surfaces is desired, such as boats, trailers, appliances, consumer electronics, or others.

In at least one embodiment, the image acquisition system 12 is a digital image acquisition system including at least one camera 18. The system 12 may include a plurality of cameras, for example, 2, 3, 4 or more cameras 18. In one embodiment, the system 12 includes four cameras 18. The cameras 18 may be configured to surround the vehicle 16 while taking images of the vehicle 16. For example, one camera may be located or focused at each of the four corners of the vehicle, as shown in FIG. 1. In addition, multiple cameras 18 may be placed at each location. For example, 2, 3, or more cameras may be located or focused at one location (e.g., a corner of the vehicle). In one embodiment, the cameras 18 are stationary. However, the cameras may also move with the vehicle 16 by, for example, being located on a conveyor belt or other moving platform.

The cameras 18 may be any suitable digital camera for taking color images. The camera may have any resolution sufficient to provide accurate color data to the image analysis system 14. For example, the cameras may have a resolution of about 5 to 10 megapixels. The camera may have a higher resolution, however, file sizes may become large if the resolution is increased substantially. In addition, resolutions below 5 megapixels may be sufficient in some embodiments. The cameras 18 may be configured to take 8-bit color images or higher, for example, 10, 12, 14-bit or higher. In an 8-bit color image, each pixel has a color value associated therewith having 256 ($2^8$) bins, with values from 0 to 255. Higher numbers of bits have an increased range of bins, and may provide a more detailed analysis, however, for determining color harmony an 8-bit image is generally acceptable and reduces the amount of processing required compared to higher bit images. Lower bit images may also be used, however, the analysis may be less detailed and/or precise.

The vehicle 16 may be still or may be moving when imaged by the cameras 18. Therefore, the cameras 18 may have a shutter speed that is sufficiently fast to avoid blurring of a moving vehicle. For example, the vehicle 16 may be on a conveyor 34 moving at 10, 25, 50 feet per minute or faster. Color mismatch may be visible to a human observer at a distance of up to about 50 feet. Photographs taken from this distance are also able to determine color mismatches, therefore, the cameras 18 may be configured to be up to about 50 feet from the vehicle 16 when the images are taken. The analysis may be improved by having the cameras 18 closer to the vehicle, for example, up to 20 feet from the vehicle. In one embodiment, the cameras 18 are from 0.5 to 10 feet from the vehicle. In another embodiment, the cameras 18 are from about 1 to 5 feet from the vehicle. The cameras 18 generally do not come in contact with the vehicle during imaging.

In addition to cameras 18, the image acquisition system 12 may include one or more lights 20. In one embodiment, each camera 18 may have one or more lights 20 associated therewith. For example, if there are four cameras 18, there may be two lights 20 associated with each camera 18, for a total of eight lights 20, as shown in FIG. 1. The number of lights 20 may depend on the number and/or type of cameras and lights being used, the size, shape, and/or location of the area being illuminated, the ambient lighting conditions, the distance of the cameras 18 from the vehicle 16, or other factors which are known to one of ordinary skill in the art. The lights 20 may be constant light sources or may be intermittent or flash sources. Constant light sources may be powerful enough to overpower ambient light conditions. Non-limiting examples of the type of lights 20 which may be suitable include incandescent, fluorescent, high-intensity discharge lighting, LEDs, strobe lights (including remote strobes), halogen light sources, strobe flashes (e.g., ring or macro flash), or an on-camera flip-up flash. In one embodiment, the lights 20 may provide a lighting environment that is consistent or uniform over an area of about one square foot of the vehicle 16.

In at least one embodiment, the cameras 18 in the image acquisition system 12 may take images that include at least two regions 22 of the vehicle 16 for comparison. In one embodiment, the two regions 22 may be adjacent to each other and may therefore be in a single image (as shown in FIG. 2). However, the regions 22 may be remote from each other in some embodiments and be in separate images. The compared regions 22 may be from two different vehicle components 24 or may be two regions 22 of the same component 24. The components 24 may be any external components of the vehicle 16 or any internal components that are visible from the exterior of the vehicle 16. In one embodiment, the components 24 analyzed include one or more of a front fascia or bumper 26, a rear fascia or bumper 28, a fender 30 and a quarter panel 32.

As discussed above, color mismatch may occur more often when two components 24 are painted in different locations or by different painters. In general, fenders 30 and quarter panels 32 are painted in an assembly plant by the vehicle manufacturer. Front fascia 26 and rear fascia 28 may be painted by a supplier and assembled with the vehicle at a later stage in the assembly process. Since front fascia 26 and fenders 30 are generally adjacent to each other on the finished vehicle, there may be an elevated risk of color mismatch between the two components. Similarly, rear fascia 28 and quarter panels 32 are generally adjacent to each other and may also have an elevated risk of color mismatch. Therefore, in at least one embodiment, the image acquisition system 12 is configured to take images that include regions 22 on a front fascia 26 and a fender 30 and/or a rear fascia 28 and a quarter panel 32. Since each vehicle may have right and left sides of the front fascia 26 and rear fascia 28 and right and left fenders 30 and quarter panels 32, in one embodiment, the system 12 may take up to four images, one of each adjacent front/rear fascia and fender/quarter panel (as shown in FIG. 1). The system 12 may take multiple images of each set of adjacent regions 22 and/or may take images of multiple regions 22 within each set of components 24.

The images taken from cameras 18 may be from any suitable angle. The angle for compared regions 22 should be substantially similar for an accurate comparison, however, small variations may be acceptable. The images may be taken straight on (e.g., perpendicular to the regions 22) or at an angle, such as 15°, 30°, 45°, 60°, 75°, or others. In one embodiment, the images may be taken at an angle from 30° to 60°. Paint colors may be observation angle dependent, and pigment flakes may increase angle dependency. Therefore, in one embodiment, images from multiple angles may be taken of the same regions 22. In one embodiment, the images may be taken by multiple cameras 18 focused on the same region 22, for example, one camera straight on (e.g., perpendicular) and one camera at 45°. In another embodiment, the same camera 18 may take multiple images of the same region 22 as the vehicle 16 moves past the camera 18, thereby changing the angle of the image.

In at least one embodiment, the image acquisition system 12 is integrated into a production or assembly line so that every vehicle 16 in the line may be imaged. The system 12 may be placed at any part of the line where the regions 22 are in position to be imaged (e.g., once a front fascia 26 and fender 30 have been attached). In one embodiment, the system 12 may be integrated into an assessment line in which the vehicle 16 is substantially complete and being inspected. The cameras 18 in the system 12 may take images while the vehicle 16 is moving (e.g., on a conveyor), thereby avoiding the addition of a new step in the production or assembly line. The system 12 may be implemented such that the images are taken by the cameras 18 as the vehicle 16 crosses a predetermined location in the production or assembly line. The lights 20 may be positioned and configured to illuminate the regions 22, described above, as the vehicle 16 crosses the predetermined location. In another embodiment, the system 12 may be attached or coupled to the assembly or production line at any point and then removed or relocated once images have been taken.

Once the images are taken by the image acquisition system 12, they are sent or transferred to at least one computer 40 in the image analysis system 14. The image analysis system 14 may be located at the same location as the image acquisition system 12 or it may be at a remote location. The images may be transferred via a wired connection (e.g., Ethernet) or wireless connection. The computer 40 may then isolate two regions 42 of pixels in each image, one from each region 22 (e.g., from a front fascia 26 and fender 30). The regions 42 may be a predetermined region from within the larger image region. The regions 42 may be selected automatically by computer software or they may be selected manually. For example, an operator may input the regions 42 once and then the same regions 42 may be used automatically for subsequent similar vehicles 16. If the type of vehicle 16 changes or another region is to be analyzed, the regions 42 may be updated or changed.

The regions 42 may have a suitable size to provide accurate color data. The regions 42 may also be large enough to average out any minor variations. For example, the region 42 may be large enough to cover more than a single pigment flake. In one embodiment, the regions 42 may have an area of at least 0.25 in$^2$. In another embodiment, the regions 42 may have an area of at least 0.5 in$^2$. In another embodiment, the regions 42 may have an area of at least 1 in$^2$. In another embodiment, the regions 42 may have an area of at least 2 in$^2$. In another embodiment, the regions 42 may have an area of at least 4 in$^2$. The pixel density for the regions 42 may be any suitable value to provide an accurate color comparison. For example, the pixel density may be 100 pixels per inch (PPI) or greater (e.g., 250, 500, 750, or 1000+ PPI). The regions 42 may have any shape, for example, square, rectangle, triangle, circle, oval, or others. The regions 42 may also have an irregular shape. For example, the regions 42 may be a 1"×1" square, a 1"×2" rectangle, a 1" diameter circle, or other shapes. In one embodiment, the regions 42 are from substantially flat areas of regions 22 on the vehicle 16.

Once the regions 42 are isolated in each image, the regions 42 are compared to determine if there is a color mismatch. Any suitable method of comparison may be used to compare the regions 42. In one embodiment, the red, green, and blue (RGB) values of the pixels in each region may be averaged for each color value (e.g., average red value, average green value, and/or average blue value) and/or a standard deviation of each color value may be found. The averages and/or standard deviations of the RGB values of two regions 42 may be compared, and if the difference of one or both exceeds a threshold value then the vehicle may be flagged for having an unacceptable color harmony profile or for needing further review. The threshold value may be expressed as a percentage, for example, a 5%, 10%, or 20% difference between the values. However, the threshold value could also be an absolute difference, a ratio, or any other suitable metric. The vehicle may be flagged if any one of the R, G, or B values (e.g., average or standard deviation) is above the threshold value, if two of the RGB values are above the threshold value, or if all three of the RGB values are above the threshold. If a vehicle 16 is flagged, the system 14 may generate and send an alert, cause an alarm to go off, or provide some other indication that a vehicle has been flagged.

The threshold value may be adjusted depending on multiple parameters, such as the paint color, camera angle, vehicle type, quality control tolerance, or others. Some colors may look acceptable despite a relatively high color mismatch between two regions 22. For example, white or black vehicles may look acceptable at a certain level of color mismatch but a highly chromatic color such as red or blue may look unacceptable at the same level of color mismatch. Therefore, the threshold value may be adjusted depending on the vehicle color being analyzed. In addition to varying by color, mismatch may also be angle-dependent such that two regions 22 appear to have color harmony from one angle but not at another (e.g., from straight on but not at a 45° angle). Therefore, the threshold value may be adjusted based on the camera angle relative to the regions 22.

As discussed previously, color harmony may be considered a hallmark of quality and craftsmanship. Therefore, color mismatch may be less acceptable on higher-end or luxury vehicles. Accordingly, the threshold values may be adjusted depending on the vehicle style, model, price, or other parameters so that vehicles that are considered higher-end have lower thresholds for mismatch. The threshold values may also be adjusted based on the acceptable number of "false negatives" (e.g., the mismatch is above the threshold but the vehicle looks acceptable) and/or missed mismatches (e.g., the mismatch is below the threshold but the vehicle looks unacceptable). Setting a threshold low may result in more vehicles being flagged than necessary, while setting it high may result in not enough vehicles being flagged. Non-limiting examples of threshold values may include up to 3%, 5%, 10%, 15%, 20%, or 25%. In one embodiment, the threshold value may be from 3 to 20%. In another embodiment, the threshold value may be 3 to 15%. In another embodiment, the threshold value may be 3 to 10%.

In addition to RGB values, other color space conventions known to those of ordinary skill in the art may be used. For example, the lightness, red-green, and blue-yellow (L, a, b) convention may be used or calculated from the RGB values. The Lab convention may be used in a similar manner to the RGB values, by comparing averages and standard deviations between pixels in the regions 42. Another alternative is comparing the color histograms for all of the pixels in the regions 42. This method is described in U.S. Pat. No. 8,326,017, the disclosure of which is hereby incorporated in its entirety by reference herein. In U.S. Pat. No. 8,326,017, an absolute comparison of the colors of a vehicle are compared to standard or "fingerprint" values/curves that are stored for each color, rather than making a relative comparison between components on the same vehicle.

Figure 3:
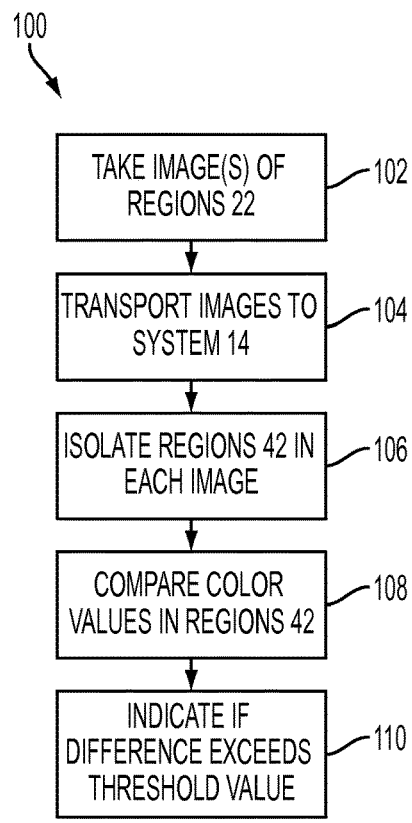
FIG. 3 is an algorithm for analyzing color harmony according to an embodiment.

With reference to FIG. 3, an algorithm 100 is illustrated which may be used to perform a color harmony analysis using the above system 10. In step 102, digital cameras 18 in image acquisition system 12 may take images of regions 22 of an object, such as a vehicle 16. The images may be transported or sent to the image analysis system 14 in step 104, for example, to computer 40. In step 106, the computer 40 (e.g., using software) may isolate regions 42 in the images for comparison. In step 108, the computer 40 may compare color values in the regions 42 to one another. The color values may be RGB values, Lab values, or other suitable color analysis values. The color values may be averages, standard deviations, or other metrics for comparing between color samples. In step 110, a difference between the color values in regions 42 is determined and the difference is compared to a predetermined threshold value. If the difference is greater than the threshold value, the system 14 indicates that the object (e.g., vehicle) may have a color mismatch. The threshold value may be a percentage difference, absolute color difference, or other indication of a difference in color. The threshold value may be different depending on the object being analyzed. For example, the threshold value may change based on the color, image angle, object/vehicle type, tolerance levels, or others.

The comparisons performed by image analysis system 14 may be performed by software, which may be loaded on the computer 40 or accessed remotely. The computer 40 may include memory having stored instructions which, when executed by the computer, carry out the included steps. The data acquisition and analysis may be performed using any suitable software, such as the LabView programming environment, Adobe Photoshop®, or others. The software may be programmed to perform the comparisons, as described above. In at least one embodiment, the software may include different threshold or tolerance values depending on the vehicle color. The software may therefore include higher thresholds for some colors in the analysis algorithm and lower thresholds for other colors, as described previously. Each vehicle 16 may have a tag associated with it, for example an electronic tag, that includes the color of the vehicle 16. The tag may also include information regarding the vehicle type (e.g., "luxury") or other parameters. These tags are generally already attached to the vehicle 16, and do not require extra cost or materials. The software may have access to the information on the tag and therefore know the color, type, or other information about the vehicle 16 and what its threshold or tolerance should be for color mismatch.

The system 10, including image acquisition system 12 and image analysis system 14 has many benefits. The system 10 may be integrated into an existing production or assembly line in an assembly plant or other facility. Enlarging or modifying the existing equipment may therefore be avoided, which would likely add significant cost and disrupt production. In addition, the image analysis may be done very quickly, such that the process may be done without stopping the vehicle or even without slowing down the production or assembly line. In one embodiment, the images may be acquired and analyzed in up to 5 seconds. In another embodiment, the images are acquired and analyzed up to 3 seconds. In another embodiment, the images are acquired and analyzed in up to 2 seconds. In another embodiment, the images are acquired and analyzed in up to 1 second.

Another benefit of the system 10 is that it is non-contact. The analysis is done using images taken from cameras, so there is no risk of damaging or otherwise affecting the vehicle paint. The system 10 may also be highly cost effective, since it does not otherwise affect the production process and it is able to analyze every vehicle coming off the line using components and software that are not prohibitively expensive. In addition, no human labor or cost is required for the system 10 to operate, other than receiving an alert or other indication when a vehicle has an unacceptable color mismatch. The system 10 may also be fully automated, so that random spot checks or other current practices to determine color match may become unnecessary. In addition, due to color angular dependence, the system 10 may identify assembly errors by recognizing color mismatches between components that are crooked, misshapen, misaligned or otherwise located at an incorrect angle relative to an adjacent component.

Example

Six samples each of four paint colors were imaged in pairs using a digital camera. The images were analyzed using LabView software to compare the average RGB values of the first sample to the other samples of the same color. Each pair of samples was imaged twice, first with one sample on the left and the other on the right, and then switched for the second image. As shown in FIG. 4, the average R, G, and B value of each sample was determined, and then the absolute and percent differences between the values were calculated. The rightmost two columns show the difference in maximum and average $\Delta E$, which is a measure of the color difference between two samples. The $\Delta E$ value is calculated using Lab coordinates and is determined with a colorimeter, which comes in contact with the sample. One method of calculating $\Delta E$ is shown in the equation below:

$$\Delta E = ((a_1-a_2)^2 + (b_1-b_2)^2 + (L_1-L_2)^2)^{1/2}$$

As shown in FIG. 4, for the non-contact relative color comparisons, most samples had a difference of up to about 10%, however, some samples had differences of up to 15%, 20%, or more (e.g., Sterling Gray samples 1 and 6).

Implementations of illustrative embodiments disclosed herein may be captured in programmed code stored on machine readable storage mediums, such as, but not limited to, computer disks, CDs, DVDs, hard disk drives, programmable memories, flash memories and other permanent or temporary memory sources. Execution of the programmed code may cause an executing processor to perform one or more of the methods described herein in an exemplary manner.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer system comprising a computer having memory storing instructions which, when executed by the computer, carries out the following steps:
   receiving image data of a first region of a first component of a painted vehicle and a second region of a second component of the painted vehicle, the first region and the second region each being painted according to a same color master;
   comparing a first red, green, and blue (RGB) color value from the first-region image data and a second RGB color value from the second-region image data to obtain a color value difference therebetween; and
   determining if the color value difference exceeds a predetermined threshold based on a color of the vehicle to identify a color mismatch between the first region and the second region of the painted vehicle.

2. The system of claim 1, wherein the first region is painted at a first location, the second region is painted at a second location that is different from the first location, and the first component and second component are adjacent on the painted vehicle.

3. The system of claim 2, wherein the first component is a fender or a quarter panel and the second component is a front fascia or a rear fascia.

4. The system of claim 1, wherein the first and second color values are each an average color value of the first and second regions, respectively.

5. The system of claim 1, wherein the image data of the first and second regions are included in a single image file.

6. The system of claim 1, wherein the image data of the first and second regions are included in first and second image files, respectively.

7. The system of claim 1, wherein the predetermined threshold is from 3 to 20%.

8. The system of claim 1, wherein the first and second regions are predetermined first and second regions selected from a larger image region.

9. The computer system of claim 1, wherein the threshold is further based on an image angle of the image data of the first region and the second region.

10. A color harmony analysis method comprising:
    comparing a first average RGB color value of an image from a first region of a first component of a painted vehicle traversing a production line and a second average RGB color value of the image from a second region of a second component of the painted vehicle to obtain a difference; and
    identifying a mismatch when the difference exceeds a threshold based on a color of the vehicle.

11. The method of claim 10, wherein the first component is adjacent to the second component and the first component and the second component are painted according to a same color master.

12. The method of claim 11, wherein the first component and the second component were painted in different locations.

13. The method of claim 10 further comprising:
    imaging at least two separate pairs of first regions and second regions of the same painted vehicle as it moves on a production or assembly line;
    comparing a first RGB color value from the first region and a second RGB color value from the second region to obtain a color value difference in each pair; and
    determining if the color value difference in at least one pair exceeds a threshold value to identify a color mismatch.

14. The method of claim 10, wherein the threshold includes an upper and lower limit, each based on the color of the vehicle.

15. A method comprising:
    responsive to a difference of an average RGB color value of a first region of a first component of a painted vehicle traversing a production line and a second region of a second component of the vehicle from a same image exceeding a variable threshold including upper and lower bounds each being based on the color of the vehicle, identifying a mismatch.

16. The method of claim 15, wherein the threshold is further based on an angle of the image respective the painted vehicle.

17. The method of claim 15, wherein the first region is larger than a pigmentation flake of the painted vehicle.

18. The method of claim 15, wherein the second region is larger than a pigmentation flake of the painted vehicle.

19. The method of claim 15, wherein the threshold is further based on a size of a pigmentation flake of the vehicle.

20. The method of claim 15, wherein responsive to the mismatch, the production line is stopped.

* * * * *